Nov. 10, 1942.     E. GATEWOOD     2,301,267
CONTRIVANCE FOR ADVERTISING PURPOSES AND FOR ENTERTAINMENT
Filed April 26, 1941
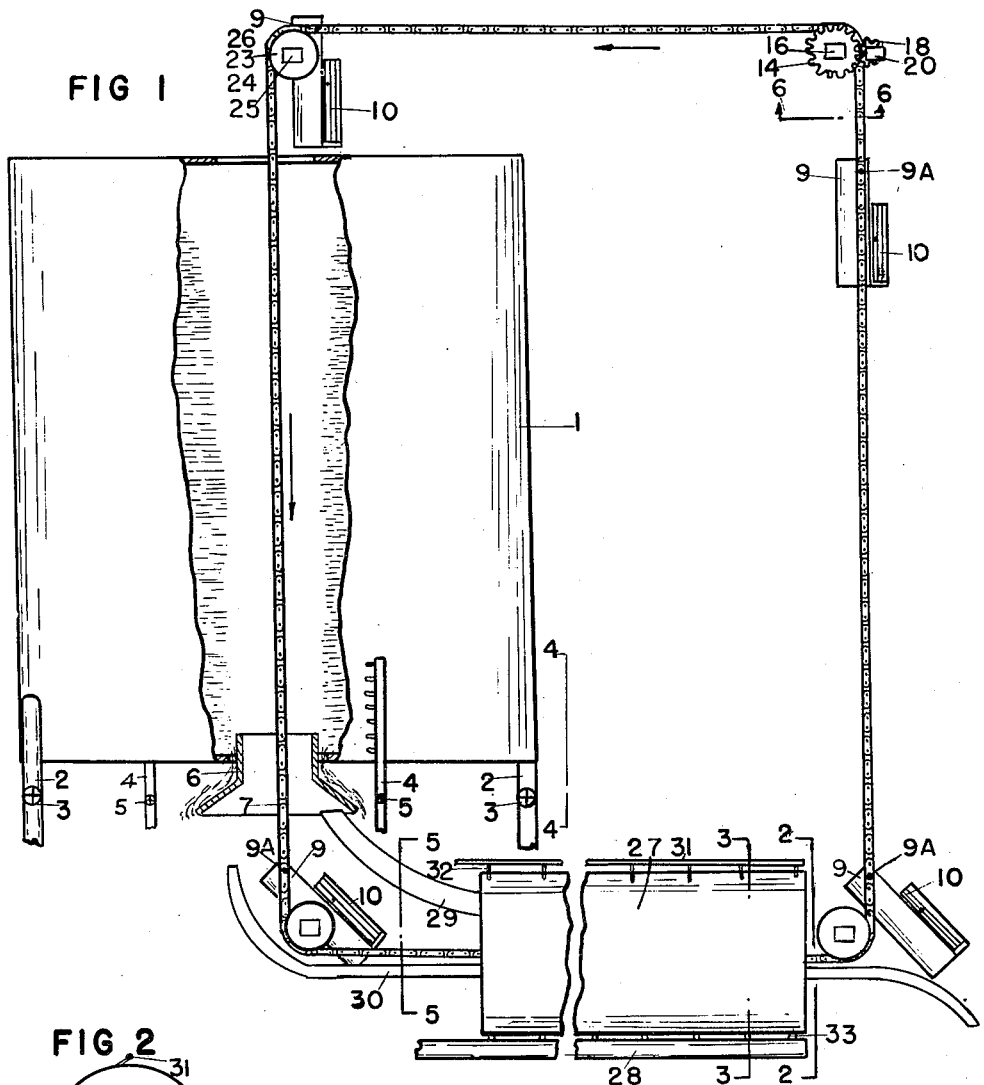
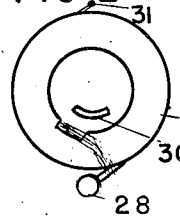
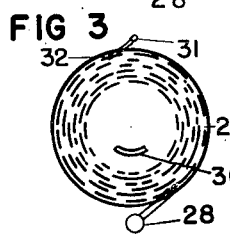
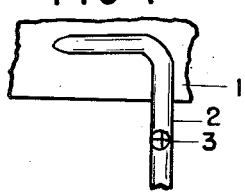
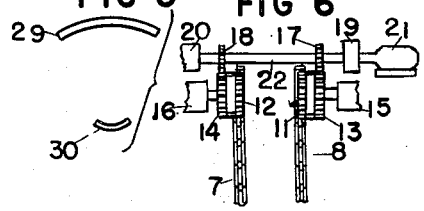
Inventor:
Elbrige Gatewood Patented Nov. 10, 1942

2,301,267

UNITED STATES PATENT OFFICE 2,301,267

CONTRIVANCE FOR ADVERTISING PURPOSES AND FOR ENTERTAINMENT

Elbrige Gatewood, New York, N. Y.

Application April 26, 1941, Serial No. 390,506

11 Claims. (Cl. 272—17)

This application is a continuation-in-part of the co-pending application Serial Number 229,901 which is now Patent Number 2,268,932.

It has been observed that, if a vessel is filled with water and a small hole is made in the bottom of the vessel, the natural forces which produce whirlpools take effect and quickly build up a rotary movement which produces an opening in the water from the top of the water to the opening in the bottom of the vessel.

This opening in the water is almost cylindrical in shape for the greater part of its length, spreading out in funnel shape near the surface.

The object of this invention is to produce such a phenomenon in a suitable vessel, to give permanence to it by providing means for replenishing the water as fast as it runs out without breaking the opening, and to provide means for transporting persons or objects through the opening in the water and out through the bottom of the vessel without permitting them to come into contact with the water.

The object is also to provide the vertical water passage as above described joined, by means of a protecting canopy with water flowing over the canopy and forming walls of water on both sides thereof, to a horizontal water tunnel produced by giving water in a pipe or tunnel a rotary movement of sufficient velocity that the water will cling to the walls of the tunnel and leave an open tunnel through the center of the pipe, and means of transportation of persons or objects in a continuous passage through the whirlpool and water tunnel.

The object is to provide, in small sizes suitable for use in advertising display windows to amuse and entertain and thus attract attention to articles advertised, the permanent whirlpool as described, either alone or in conjunction with the means of passage and the horizontal water tunnel. When used for this purpose the vessels will commonly be made of transparent material.

The object is also to provide large installations suitable for parks where an ample supply of water under pressure can be obtained at small cost, as at Yosemite Falls and other places at the foot of high waterfalls, and in amusement parks where a sufficient trade can be found to justify the use of pumps.

Referring to the drawing:

Figure 1 is a side view of the complete device combining the vertical whirlpool and the horizontal water tunnel, with a cut-away through the center of the tank illustrating the approximate shape of the opening through the water, and the means at the bottom for permitting exit without coming into contact with the water.

Figure 2 is a view on the line 2—2 of Figure 1 showing the appearance of the exit from the horizontal tunnel.

Figure 3 is a view on the line 3—3 of Figure 1 showing the water and the trackway, also means for rotating the water.

Figure 4 is a side view on the line 4—4 of Figure 1 showing a pipe used for injecting water under pressure into the tank to replenish the water and to aid in the rotary motion.

Figure 5 is a view on the line 5—5 of Figure 1 showing the trackway, and the upper canopy which keeps water off the passengers.

Figure 6 is a view on the line 6—6 of Figure 1 showing the motive power and the means whereby the elevators are moved around the circuit through the whirlpool and water tunnel.

Referring now to the drawing, a vessel 1 containing an opening in the bottom is filled with water. As the water runs out at the bottom, a rapid rotary motion is built up which soon reaches such velocity that an opening forms in the water from top to bottom. Experiment shows that this opening is substantially cylindrical in shape for most of the distance, becoming more funnel shaped at the top.

This opening, once formed, maintains itself until all of the water runs out of the vessel, but is broken if any substantial amount of water is poured into the vessel. The pipes 2 are provided to replace the water as fast as it runs out without breaking the water opening. This is accomplished by injecting the water in the direction of rotation with such velocity that it aids the circulation. The pipes 2 are provided with valves 3.

The pipes 4 admit air or steam as desired through numerous small inlets in the direction of rotation to aid in increasing the velocity of rotation to lessen the amount of water that will run out at the bottom, and to produce novel effects in the water as may be desired. The pipes 4 are provided with valves 5.

A pipe or tunnel 27 enclosed at the ends by collars, with a passageway 30 through the center, contains water rotating at such velocity that centrifugal force holds the water to the sides of the tunnel and leaves the center free of water. The water is introduced through nozzles 33 in the pipe 28 which carries water under pressure.

The minimum velocity of the rotating water to provide the necessary centrifugal force is determined by the formula $v = 5.67 \times \sqrt{R}$ where $v$ equals the velocity of the water in feet per second, and R equals the radius of curvature in feet. This formula derives from the relation $g=v^2/R$ wherein $g=32.2$ feet per second per second.

An additional pipe 31 may be provided for introducing steam or air to keep up the flow of water, thus reducing the amount of water that must be provided by the pipe 28.

The elevator cars 9 are cylindrical in shape, with a door 10. The upper part of the front of the cars is open to permit a view of the water and to permit the water to be touched by the hand. The cars are attached by pins 9A to two chains 7 and 8 which mesh with the teeth of gears 11 and 12, which gears are driven through 13 and 14, and 17 and 18 actuated by the motor 21, as shown in Figure 6. The shaft of motor 21 is supported by stationary bearings 19 and 20. The rotatable unit comprising gears 11 and 13 is supported by the stationary part 15 which consists of a shaft and its support. Number 16 is a similar part for unit 12, 14.

Pulleys 23, 24 are placed as required to guide the chains 7, 8. Parts 25 and 26 are stationary shafts similar to 15 and 16, and respectively support pulleys 23 and 24.

As will be seen, the cars descend through the vertical whirlpool and slide through the tunnel 27 on the trackway 30 with the passengers gazing upward at the water which flows over them.

In the large size used in parks, passengers will be transported. In small models used for advertising purposes, dolls or other objects which will add interest to the display or which call attention to articles that the display is designed to advertise may be carried.

The manner of operation of the form shown in the drawing is as follows. The opening in the bottom of the tank 1 is preferably closed as tightly as practicable. Then the valves 3 are opened to admit water under pressure into the tank. When the tank is filled, the opening at the bottom is opened and the water begins to run out. A whirl is quickly produced which results in a vortex extending as shown. Water then runs out around the sides of the circular opening and is allowed to run off the sloping sides of the funnel shaped part 6.

The tank could be filled without closing the bottom of the tank since the velocity of the water entering through pipes 2, and an increased velocity that could be built up by admitting steam or compressed air through the pipes 4 would produce a sufficient whirl to enable the tank to fill.

Water is turned into the tunnel 27, entering through inlets 33 with such velocity that it clings to the side of the tunnel wall and makes a complete circuit, where it meets the incoming stream and is given another impulse. The water quickly builds up until it reaches the point where it overflows at the ends or other places of overflow that may be provided.

Steam or compressed air can be admitted through the pipe 31 and inlets 32 to asssist in maintaining the necessary rotary velocity. There is no connection between the action of the tank and the tunnel; they operate independently. To improve the effect, the space between the bottom exit of the tank and the entrance of the tunnel will be enclosed and the water from the tank allowed to run over the canopy 29 to provide an illusion of a continuous water passage.

The motor 21 is started and passengers step into the doors of the elevators 9, which are moving at such slow speed that entrance and exit are easy at any platform that may be provided.

The two chains 7 and 8 move slowly along between the pulleys in the circuit shown, carrying with them the elevators. The passengers go slowly through the center of the whirlpool, and can reach out and touch the whirling water. For additional effect rubber balls of various colors may be released in the water. Small sailing vessels may float at the top of the water and spin dizzily about the vortex, which will seem constantly about to suck them down. Clouds of small bubbles of air may be injected through pipe 4, or colored water may be injected.

While the method of maintaining a tank full of water and a vortex through the water as shown in the drawing is the preferred one, I do not limit myself to this means. Any method, such as rotating vanes in the water, which would keep the water spinning at sufficient velocity to form a vortex or to assist the natural action of the whirlpool might be used.

Instead of operating on the principle of the whirlpool, the water in the tank might be rotated by means of the incoming water, or air or steam as shown, or by mechanical means, to the exclusion of the whirlpool principle and without any water running out at the bottom of the tank. This would not produce so desirable an opening in the water since the opening would not be so nearly cylindrical as that produced by whirlpools, but would be saucer shaped or cup shaped.

I claim:

1. A means of entertainment and amusement consisting of an open vessel of water surrounded by open air with the water rotating at sufficiently high velocity to produce a whirl with a steep sided opening in its center, including a means of rotating the water, and means whereby persons may descend into the center of the whirl and may emerge out of the bottom of the tank into the open air without coming into contact with the water.

2. In a device for amusement and entertainment consisting of an open vessel, with water in the vessel rotating at such velocity that centrifugal force produces a whirl through the water with an opening in its center, a means for producing and keeping up the rotation of the water consisting of injecting steam into the water under pressure and in the direction of rotation of the water.

3. An advertising novelty consisting of a vessel with a hole in the bottom of the vessel, with water in the vessel and a whirlpool in the water forming a funnel shaped opening through the water, with means for catching the water as it runs out of the bottom of the vessel and carrying it away without wetting objects passing through the opening in the water, and means for transporting said objects through the water and out the bottom of the tank without wetting them.

4. A combination consisting of an open vessel filled with water, and with a hole in the bottom of the vessel through which the water may escape and thereby create a whirlpool in the vessel which will open a funnel shaped pathway through the water to the hole in the bottom of the tank, means catching the water as it runs out at the bottom of the tank and carrying it away without wetting passengers or objects passing through the pathway and out the bottom of the tank, means adding to the water in the tank as fast as it escapes without disturbing the whirlpool or said pathway, and means transporting passengers or objects through said pathway.

5. A combination consisting of an open vessel filled with water and with a hole in the bottom of the vessel through which water escapes, causing a whirlpool to form which causes a vertical passageway to form from the top of the water to the hole in the bottom of the vessel, means catching water running out of the sides of the hole without wetting passengers descending through the passageway, a horizontal pipe or tunnel with water running around the inner wall of the pipe with sufficient velocity to cling to the sides by centrifugal force, leaving a passageway through the center of the pipe free of water, and with collars on the ends of the pipe to hold water at a desirable depth against the sides of the pipe, means applying energy to the water in the horizontal pipe to keep it flowing at sufficient velocity, means adding water as required, a protecting canopy from the opening in the tank to the opening in the horizontal pipe or tunnel providing protection from water to passengers, and with water flowing over the canopy to form walls of water on two sides of passengers, and means transporting passengers in continuous passage through the horizontal and vertical passageways in the water.

6. An advertising novelty as in the preceding claim and of size suitable for use in display windows to attract attention.

7. A method of applying energy to water in open vessels to secure a rapid rotation which causes the water to cling to the sides of the vessels by centrifugal force, leaving a passageway through the water at the center of the vessels, consisting of introducing steam under pressure in the direction of the desired rotation.

8. A method of providing an opening or tunnel in water for purposes of amusement or entertainment consisting of giving the water a rapid rotary movement by introducing steam under pressure in the water in the direction of the desired rotary movement.

9. An advertising display consisting of a small vessel made of transparent material, with a hole in the bottom of the vessel through which water runs out, creating a whirlpool in the vessel with a funnel shaped opening in the water from the surface of the water to the opening in the bottom of the vessel, means adding water to the vessel without breaking the whirlpool, means protecting objects passing through the funnel shaped opening from contact with the water upon emerging at the bottom of the vessel, a horizontal pipe made of transparent material, means injecting water into the pipe near its inner surface and in the direction of its circumference with sufficient velocity that the water will cling by centrifugal force to the inner wall of the pipe leaving the inner circumference free of water as a tunnel through swiftly flowing water, means adding energy to the flowing water to preserve its velocity, collars on the ends of the pipe partially closing the ends to keep water of a desired depth in the pipe along its inner circumference, a protecting canopy joining the opening at the bottom of the vessel containing the whirlpool to the pipe containing the water tunnel in a manner to keep objects from contact with water in passage from one to the other, and means carrying small dolls or other objects, suitable for advertising or to draw attention, in continuous passage through the transparent vessel and the transparent tank without contact with the water 10. A display advertising device for attracting attention, consisting of an open vessel with a hole in the bottom, water in the vessel running out through the bottom and providing a whirlpool in the water with a long tube-like opening in the water from the top of the water to said opening in the bottom, means adding water to said vessel as fast as it runs out, and means applying energy to the water in the direction of rotation to prevent the incoming water breaking said whirlpool.

11. A means of amusement and entertainment consisting of a vessel open at both ends, water in the vessel rotating at a sufficiently high velocity to provide by centrifugal force an opening through the water at the axis of rotation, means injecting steam into the water in the direction of its rotation to keep up its high velocity of rotation, and means whereby persons or objects can complete a circuit through said openings in the vessel and through said opening in the water and return to the starting point without coming into contact with the water.

ELBRIGE GATEWOOD.